United States Patent [19]

Digonnet et al.

[11] Patent Number: 5,701,318
[45] Date of Patent: Dec. 23, 1997

[54] POLARIZED SUPERFLUORESCENT FIBER SOURCES

[75] Inventors: Michel J. F. Digonnet, Palo Alto; Dario G. Falquier, Menlo Park, both of Calif.; Jefferson L. Wagener, New Providence, N.J.; H. John Shaw, Stanford, Calif.

[73] Assignee: The Board of Trustees of the Leland Stanford Junior University, Stanford, Calif.

[21] Appl. No.: 645,965

[22] Filed: May 10, 1996

[51] Int. Cl.$^6$ ........................................... H01S 3/38
[52] U.S. Cl. ........................... 372/6; 372/64; 372/106; 372/703
[58] Field of Search ..................... 372/6, 64, 106, 372/703

[56] References Cited

U.S. PATENT DOCUMENTS

| 5,106,193 | 4/1992 | Fesler et al. ............................. 372/6 |
| 5,319,652 | 6/1994 | Moeller et al. ............................ 372/6 |
| 5,388,110 | 2/1995 | Snitzer .................................... 372/6 |

OTHER PUBLICATIONS

R.A. Bergh, et al., Single–mode fiber–optic polarizer, *Optics Letters*, vol. 5, No. 11, Nov. 1980, pp. 479–481.

R.A. Bergh, et al., All Single–mode fiber–optic gyroscope, *Optics Letters*, vol. 6 No. 4, Apr. 1981, pp. 198–200.

William K. Burns, et al., Fiber–Optic Gyroscopes with Broad–Band Sources, *Jouranl of Lightwave TEchnology*, vol. LT–1, No. 1, Mar. 1983, pp. 98–105.

A.N. Tobin, et al., The design and performance of fibre optic polarizers and polarization beamsplitters, *Components for Fiber Optic Applications and Coherent Lightwave Communications*, SPIE vol. 988, 1988, pp. 77–81.

Emanuel Desurvire, et al., Amplification of Spontaneous Emission in Erbium–Doped Single–Mode Fibers, *Journal of Lightwave Technology*, vol. 7, 1989, pp. 835–845.

P.R. Morkel, Erbium–Doped Fibre Superfluorescent Source for the Fibre Gyroscope, *Optical Fibre Sensors, Springer Proceedings in Physics*, vol. 44, 1989, pp. 143–148.

P.F. Wysocki, et al., Evidence and modeling of paired ions and other loss mechanisms in eribum–doped silica fibers, *Fiber Laser Sources and Amplifiers IV*, SPIE vol. 1789, 1992, pp. 66–79.

V.J. Mazurezyk, et al., Polarization Dependent Gain in Erbium Doped–Fiber Amplifiers, *IEEE Photonics Technology Letters*, vol. 6, No. 5, 1994, pp. 616–618.

Anbo Wang, et al., Optical fiber polarizer based on highly birefringent single–mode fiber, *Optics Letters*, vol. 20, No. 3, Feb. 1, 1995, pp. 279–281.

Anthony E. Siegman, Lasers, University Science Books, Mill Valley, California, 1986, pp. 547–557.

L. Li, et al., Broadband Metal/Glass Single–Mode Fibre Polarisers, *Electronics Letters*, vol. 22, No. 19, 11th Sep. 1986, pp. 1020–1022.

R.B. Dyott, et al., Indium–coated D–shaped–fiber polarizer, *Optics Letters* vol. 12, No. 4, Apr. 1987, pp. 287–289.

(List continued on next page.)

*Primary Examiner*—Leon Scott, Jr.
*Attorney, Agent, or Firm*—Knobbe. Martens, Olson & Bear, LLP

[57] ABSTRACT

A superfluorescent fiber source outputs highly polarized light without a substantial decrease in output power efficiency. According to one embodiment, a polarizer is spliced within the superfluorescent fiber at a selected location along the length of the fiber (e.g., near the middle of the fiber). According to another embodiment, the entire length of the superfluorescent fiber is polarizing to thereby assure that one of the polarizations of light is substantially extinguished while the other polarization of light is nearly double the power which that polarization would have if the polarizer were not present within the superfluorescent fiber. In this manner, superfluorescent sources can be adapted especially for use in fiber optic gyroscopes, or the like, which require highly polarized light, without a substantial reduction in efficiency.

27 Claims, 11 Drawing Sheets

OTHER PUBLICATIONS

P. F. Wysocki, et al., 1.55 μm broadband fiber sources pumped near 980 nm, *Fiber Laser Sources and Amplifiers II*, SPIE vol. 1373, 1990, pp. 66–77.

R. F. Kalman, et al., Modeling of three-level laser superfluorescent fiber sources, SPIE, San Jose, California, Sep. 16–21, 1990.

Michael J. Messerly, et al., A Broad-Band Single Polarization Optical Fiber, *Journal of Lightwave Technology*, vol. 9, No. 7, Jul. 1991, pp. 817–820.

Michel J.F. Digonnet, Status of broadband rare-earth doped fiber sources for FOG applications, *Proceedings in Fiber Optics and Laser Sensors XI*, SPIE vol. 2070, Washington, 1993, pp. 113–131.

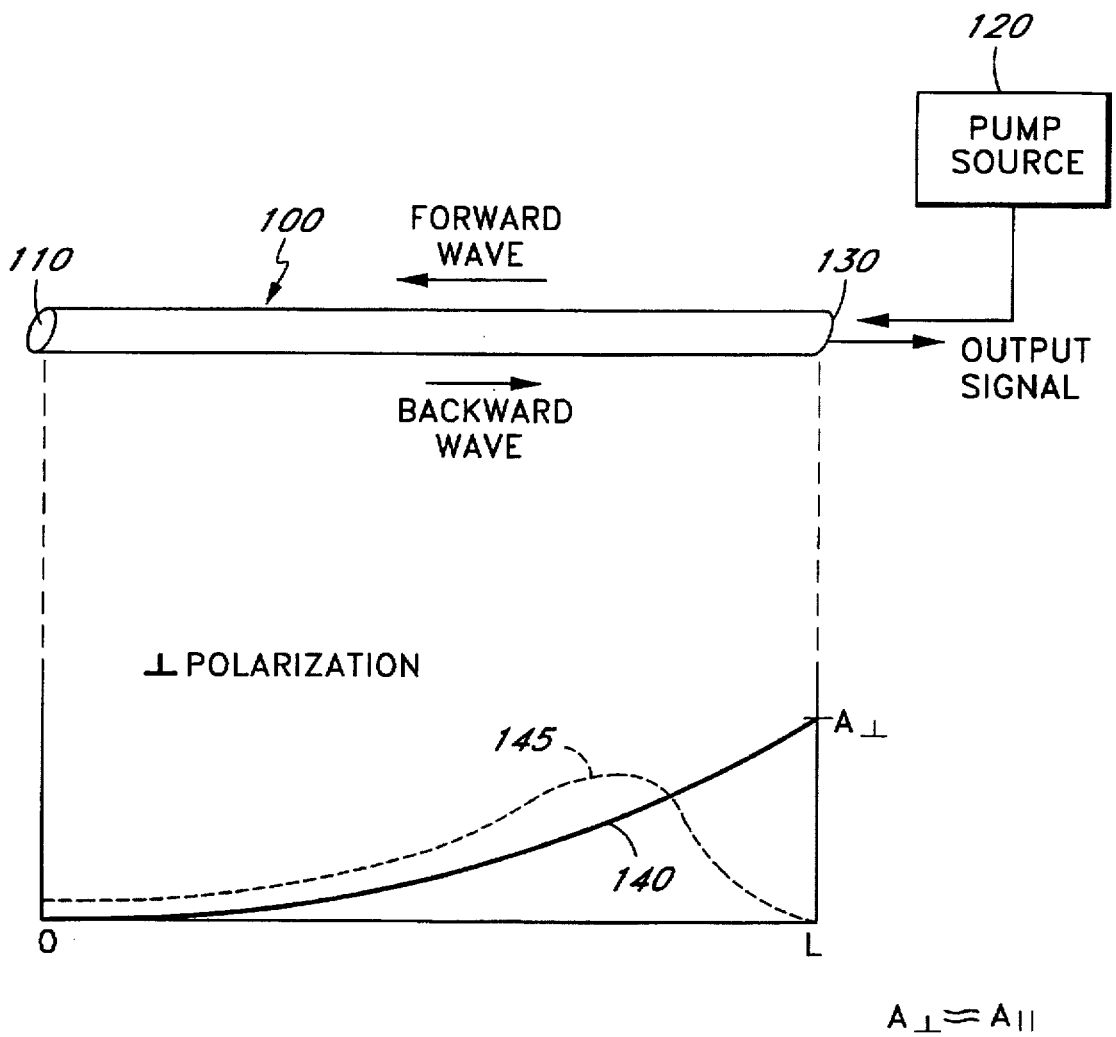
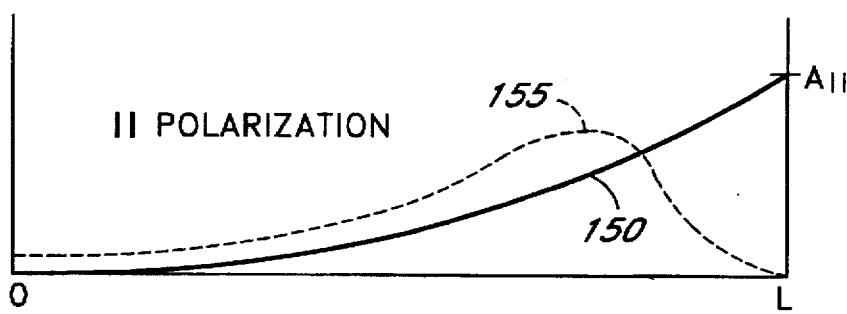
FIG. 2
*(PRIOR ART)*

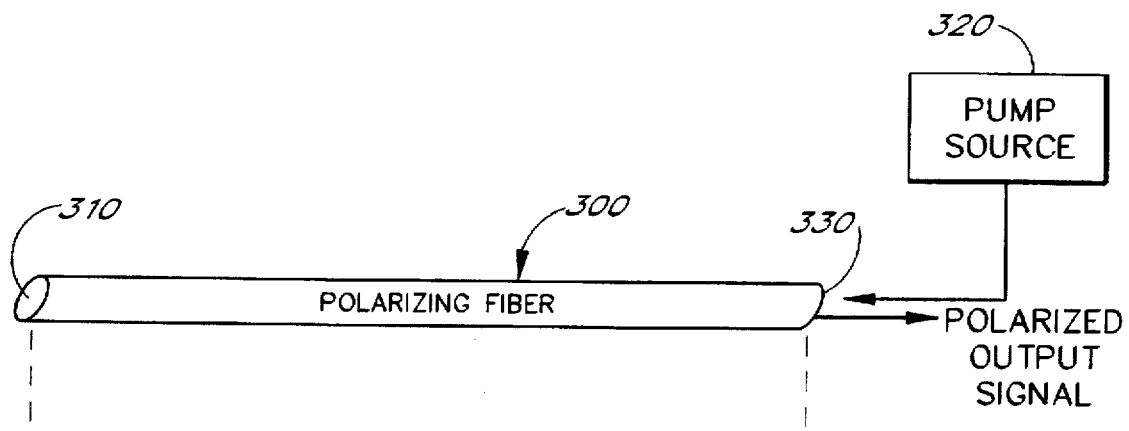
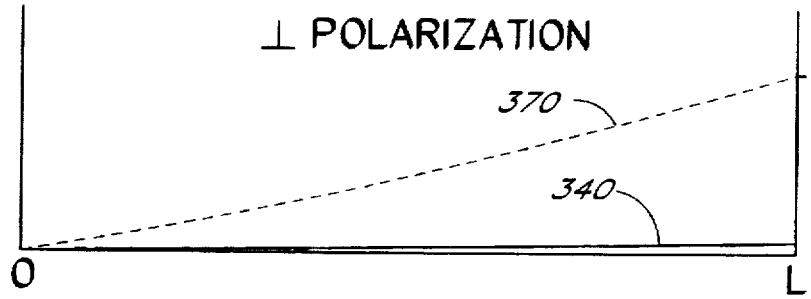
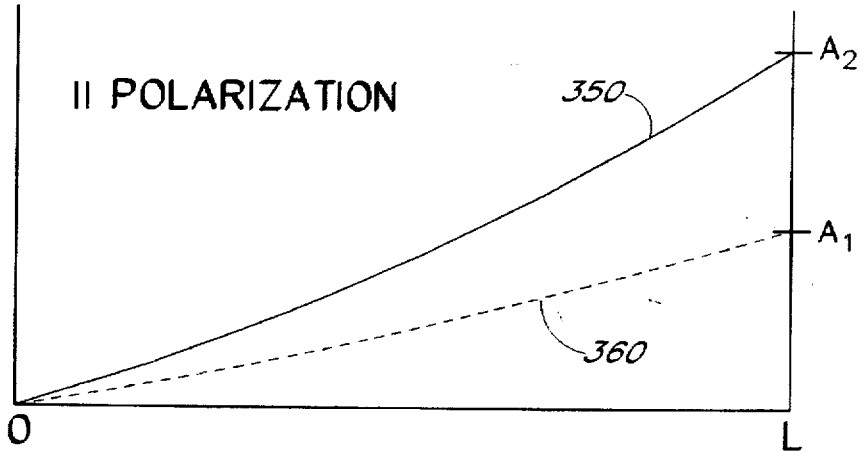
FIG. 4

POLARIZED SUPERFLUORESCENT FIBER SOURCES

BACKGROUND OF THE INVENTION

1. Field of the Invention

The present invention relates to optical fibers which are configured to act as superfluorescent light sources.

2. Description of the Related Art

Superfluorescent fiber sources (SFS) are well known in the art, and have been advantageously used to provide wideband (e.g., on the order of 10–30 nanometers) laser-like (highly directional) light beams for multiple applications. For example, FIG. 1 shows a superfluorescent fiber source 10 which provides laser light as an input to a fiber optic gyroscope 20. For a description of an exemplary superfluorescent fiber source, see an article entitled "Amplification of Spontaneous Emission in Erbium-Doped Single-Mode Fibers," by Emmanuel Desuvrie and J. R. Simpson, published by *IEEE*, in "Journal of Lightwave Technology," Vol. 7, No. 5, May 1989.

A superfluorescent fiber source typically comprises a length of single-mode fiber, with a core doped with an ionic trivalent rare earth element. For example, neodymium ($Nd^{3+}$) and erbium ($Er^{3+}$) are rare earth elements that may be used to dope the core of a single-mode fiber so that the core acts as a laser medium. The fiber receives a pump input signal at one end. The pump input signal is typically a laser signal having a specific wavelength $\lambda_p$. The ions within the fiber core absorb the input laser radiation at wavelength $\lambda_p$ so that electrons in the outer shells of these ions are excited to a higher energy state of the ions. When a sufficient pump power is input into the end of the fiber, a population inversion is created (i.e., more electrons within the ions are in the excited state than are in the ground state), and a significant amount of fluorescence builds up along the fiber in both directions. As is well known, the fluorescence (i.e., the emission of photons at a different wavelength $\lambda_s$) is due to the spontaneous return of electrons from the excited state to the ground state so that a photon at a wavelength $\lambda_s$ is emitted during the transition from the excited state to the ground state. The light which is emitted at the wavelength $\lambda_s$, from the fiber is highly directional light, as in conventional laser light. However, one main characteristic of this emission which makes it different from that of a traditional laser (i.e., one which incorporates an optical resonator), is that the spectral content of the light emitted from the superfluorescent fiber source is generally very broad (between 1 and 30 nanometers). Thus, the optical signal output by the fiber will typically be at wavelength $\lambda_s^r \pm 15$ nanometers. This principle is well known in laser physics, and has been studied experimentally and theoretically in neodymium-doped and erbium-doped fibers, and in fibers doped with other rare earths, for several years.

Light emitted from superfluorescent fiber sources has multiple applications. For example, in one application, the output of the superfluorescent fiber source is fed into a fiber optic gyroscope (e.g., the gyroscope 20 of FIG. 1). For reasons that are well understood by those skilled in the art, the fiber optic gyroscope needs to be operated with a broadband source. Of the several types of broadband sources known to exist, superfluorescent fiber sources, in particular, made with erbium-doped fiber, have thus far been the only optical sources which meet the stringent requirements for fiber optic gyroscopes. The broad bandwidth of light produced by erbium-doped fiber sources, together with the low pump power requirements and excellent wavelength stability of erbium-doped fiber sources, are the primary reasons for use of such sources with fiber optic gyroscopes.

In an erbium-doped fiber, the emission of a superfluorescent fiber source is bidirectional. That is, the light which is emitted by the return of electrons to the ground state in the erbium ions is typically emitted out of both ends of the fiber. This light is also strongly unpolarized in both directions. That is, the perpendicular and parallel polarizations of light typically have the same amplitude in both directions.

A superfluorescent source is generally implemented in one of two configurations. In a first configuration, called a single-pass superfluorescent source, the superfluorescent source output power is emitted in two directions, one of which is not used. In the second configuration, called a double-pass superfluorescent source, a dichroic reflector is placed at one end of the fiber to let the pump through but to strongly reflect the superfluorescent source signal, so that the superfluorescent signal is sent a second time through the fiber. Since the fiber exhibits gain at the signal wavelength, the signal is amplified. The advantage of this configuration is that it produces a stronger signal. A double-pass superfluorescent source configuration also produces output only at one port (i.e., in one direction). The disadvantage with such a configuration is that the wavelength of a double-pass superfluorescent source is less stable with external disturbances. In particular, the wavelength of the signal light output by a double-pass superfluorescent source is more sensitive to optical feedback from a fiber optic gyroscope.

Another difficulty encountered when implementing a superfluorescent source as an input to a fiber optic gyroscope is that, after being coupled into the fiber optic gyroscope, the first component the superfluorescent signal encounters is a polarizer. The reason that the light needs to be polarized before entering the fiber loop is that fiber optic gyroscopes require light to be in a single polarization for reasons well known to those of skill in the art. Since the light emitted from a superfluorescent fiber source is highly unpolarized, substantially 50% of the signal power is lost in the polarizer.

Summary OF the INVENTION

In accordance with a preferred embodiment of the present invention, a polarized, superfluorescent fiber source is provided. The polarized source outputs light in substantially one polarization mode at substantially the same total power which would be output in the sum of the two polarization modes from a conventional superfluorescent fiber source. The advantages of the preferred embodiment are obtained by placing a polarizer at a specified position along the fiber or by using a polarizing fiber. In a particularly preferred embodiment of the invention, an isolator can be used in addition to a polarizer to provide a polarized, unidirectional source of light which has stable wavelength characteristics.

According to a first aspect, the preferred embodiment is a superfluorescent light source comprising an optically propagating waveguide having a first end and a second end. A pump source provides a pump signal having a first wavelength at the first end of the waveguide to stimulate emission of light within the waveguide at a second wavelength different than the first wavelength. A polarizer is placed at a position along the waveguide so as to substantially increase the emission of light in a preferred polarization from one of the first and second ends of the waveguide.

In a particularly preferred embodiment, the optically propagating waveguide comprises an optical fiber and the polarizer is spliced into the fiber. In addition, the optical fiber is doped with erbium. Advantageously, the pump source emits light at a wavelength of about 1.48 micrometers and the light emitted from the waveguide has a wavelength of about 1.53 micrometers.

According to another preferred embodiment, the polarizer has an extinction ratio of greater than 15 dB and a loss in the preferred polarization of less than 1 dB.

In a still further preferred embodiment, the polarizer is placed between the 66 dB and 68 dB small-signal attenuation points, measured at the second wavelength along the length of the waveguide measured from the first end of the waveguide.

In another preferred embodiment, the polarizer is placed between 20% and 50% of the substantially complete attenuation length of the waveguide measured from the first end of the waveguide.

The preferred embodiment also comprises an optical waveguide for use as a superfluorescent light source. The waveguide comprises an optically propagating substrate, wherein at least a portion of the substrate propagates light in one polarization and extinguishes light in an orthogonal polarization. The optical waveguide is altered so that pump light input into the waveguide at a first wavelength stimulates emission of light within the waveguide at a second wavelength.

The preferred embodiment is also a superfluorescent light source comprising a pump light source which emits pump light at a first wavelength and an optically propagating waveguide. At least a portion of the waveguide propagates light in one polarization and extinguishes light in an orthogonal polarization. The optical waveguide is altered so that the pump light input into the waveguide at the first wavelength stimulates emission of light within the waveguide at a second wavelength.

The preferred embodiment is also an optical instrument comprising a pump light source which emits pump light at a first wavelength. The preferred embodiment also includes an optically propagating waveguide having a first end and a second end. A portion of the waveguide propagates light in one polarization and extinguishes light in an orthogonal polarization. The optical waveguide is altered so that the pump light input into the waveguide at the first wavelength stimulates emission of light within the waveguide at a second wavelength. A fiber optic gyroscope includes a fiber loop which receives light at the second wavelength from the waveguide as an input to the fiber loop.

In a further embodiment, a unidirectional, superfluorescent light source comprises an optically propagating waveguide having a first end and a second end. A pump source provides a pump signal at the first end of the waveguide to stimulate emission of light within the waveguide. An isolator is placed at a position along the waveguide so as to substantially increase the emission of light in a preferred propagation direction from the first end of the waveguide when the preferred propagation direction is a backward propagation direction and from the second end of the waveguide when the preferred propagation direction is a forward propagation direction.

In a still further embodiment, the superfluorescent light source comprises an optically propagating waveguide having a first end and a second end. A pump source provides a pump signal at the first end of the waveguide to stimulate emission of light within the waveguide. An optical discrimination apparatus is placed at a selected position along the waveguide so as to substantially increase the emission of light in a preferred optical mode. Light in the preferred optical mode is increased while light in a non-preferred optical mode is decreased by the action of the optical discrimination apparatus.

Under another aspect the preferred embodiment is a superfluorescent light source comprising an optically propagating waveguide having a first end and a second end. A pump source provides a pump signal having a first wavelength at the first end of the waveguide to stimulate emission of light within the waveguide at a second wavelength different than the first wavelength. A polarizer is placed at a position along the waveguide so as to maximize the emission of light in a preferred polarization from one of the first and second ends of the waveguide.

BRIEF DESCRIPTION OF THE DRAWINGS

FIG. 2 schematically illustrates an unpolarized superfluorescent fiber wherein the perpendicular and parallel polarization modes of the output signal carry substantially equal powers;

FIG. 4 schematically illustrates another preferred embodiment of the invention wherein the entire superfluorescent fiber comprises a polarizing fiber so that one polarization mode is substantially extinguished while the output signal in the other polarization mode is nearly doubled in power;

DETAILED DESCRIPTION OF THE PREFERRED EMBODIMENT

Figure 1:
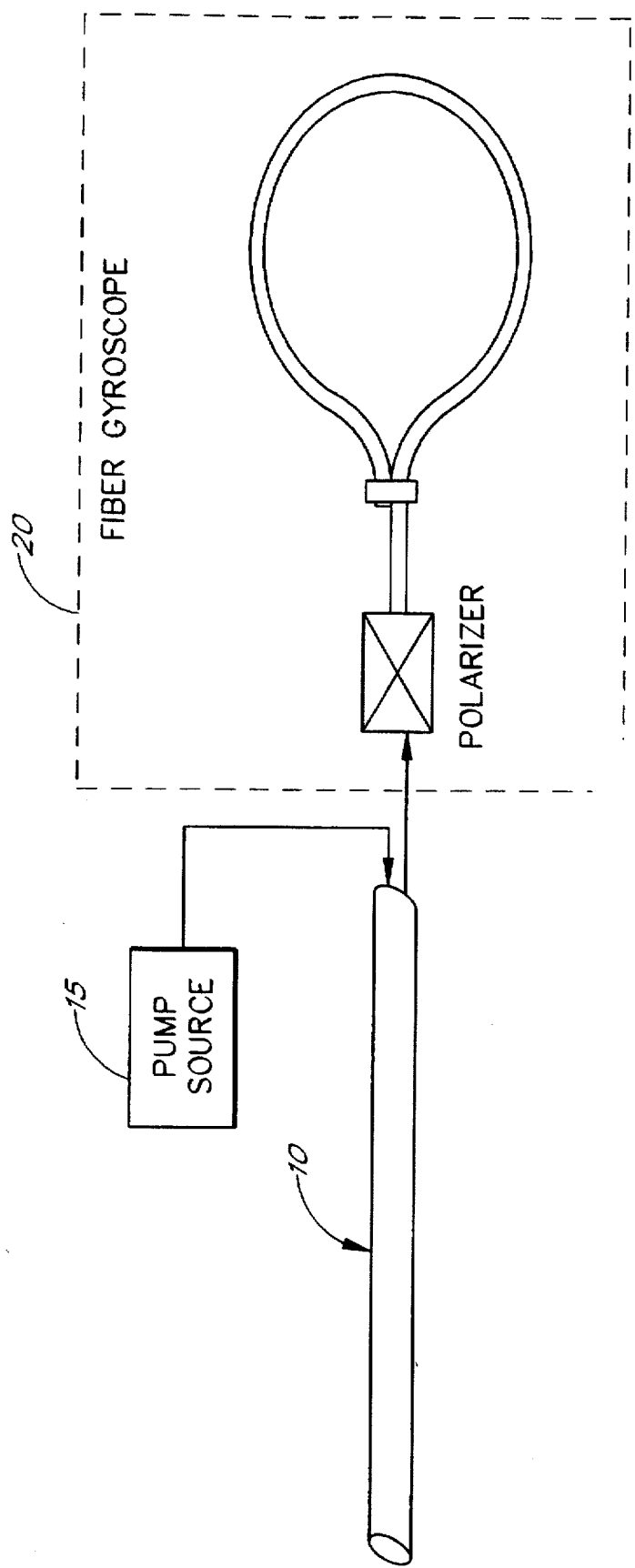
FIG. 1 is a schematic diagram which shows an exemplary implementation of a superfluorescent fiber source used to supply broadband light as an input to a fiber optic gyroscope.

FIG. 2 schematically depicts a conventional single-pass superfluorescent fiber source configuration wherein a superfluorescent fiber 100 having a first end 110 receives a laser input from a pump source 120 at a second end 130 of the fiber 100. In the embodiment described herein, the fiber 100 comprises an erbium doped silica fiber so that light in the backward propagation is used as the signal light due to the high efficiency of backward propagating light in erbium doped fibers. In addition, the ends 110, 130 are advantageously angle polished at 7°–15° to avoid Fresnel reflections (one of several methods well known in the art) in one embodiment. It should be noted that if the superfluorescent fiber 100 was configured as a double-pass source (not shown) rather than the single-pass embodiment described herein, the end 130 would be reflective at the signal wavelength but transmissive at the pump wavelength. The reflective end 130 would advantageously comprise a dichroic mirror formed by thin film deposition or the like. Alternatively, a separate dichroic mirror (not shown) formed as a separate element by coating a substrate, could be placed at the end 130 of the fiber 100. Of course, it will be appreciated that if the end 130 is made to be reflective, the end 130 would not be angle polished since the angle in the fiber end 130 would normally not reflect light back into the fiber 100.

A pump input signal from the source 120 provides a laser beam at a wavelength $\lambda_p$ which propagates through the fiber 100 in the forward direction. The length of the fiber 100, as well as the concentration of dopant (i.e., erbium) within the fiber core, is selected so that a significant portion (e.g., at least 70%) of the power from the pump source is absorbed within the fiber core to create a population inversion within the superfluorescent fiber 100. When the ions return to the ground state, photons at a signal wavelength $\lambda_s$ are emitted in both the forward and backward direction within the fiber 100. Due to the properties of erbium doped fibers, most of the light at the wavelength $\lambda_s$ emitted from sufficiently long fibers is emitted in the backward direction. This effect is well known in the art, and is disclosed in U.S. Pat. No. 5,185,789, which is hereby incorporated by reference. In this manner, most of the light at the signal wavelength $\lambda_s$ which propagates in the forward direction is absorbed and re-emitted into the backward direction and emitted from the end 130 of the fiber 100.

FIG. 2 also depicts the power of light in both the perpendicular and parallel polarizations (defined herein with respect to arbitrary orthonormal coordinates). In particular, a first curve 140 shows the distribution of the power of perpendicularly polarized light within the fiber 100 from the end 110 of the fiber to the output end 130 of the fiber 100. That is, the height of the curve 140 corresponds to the power of the light in the perpendicular polarization mode at that particular position along the fiber. The points along the length of the fiber 100 are represented in the graph as points zero to L, where L represents the length of the fiber 100. As shown in FIG. 2, the curve 140 increases steadily upward from the zero point to the end 130 of the fiber 100 at length L. A curve 150 represents the distribution of the power of parallel polarized light over the same portion of the fiber 100. That is, the height of the curve 150 corresponds to the power of light in the parallel polarization mode at that particular position along the fiber. Curves 145, 155 represent the distribution of optical power in the forward propagation direction for the perpendicular and parallel polarizations, respectively. Thus, the configuration depicted in FIG. 2 is a bidirectional source configuration (i.e., light is emitted in both the forward and backward propagation directions). As can be seen from FIG. 2, in a conventional superfluorescent source 100 comprising, for example, an erbium-doped core, the powers of the parallel and perpendicular polarizations of light in the output signal (i.e., in the backwards propagation direction) are substantially equal. Furthermore, these two polarization signals are incoherent (i.e., their phases are unrelated) so that the light signal output from the end 130 of the fiber 100 is substantially unpolarized.

Figure 3A:
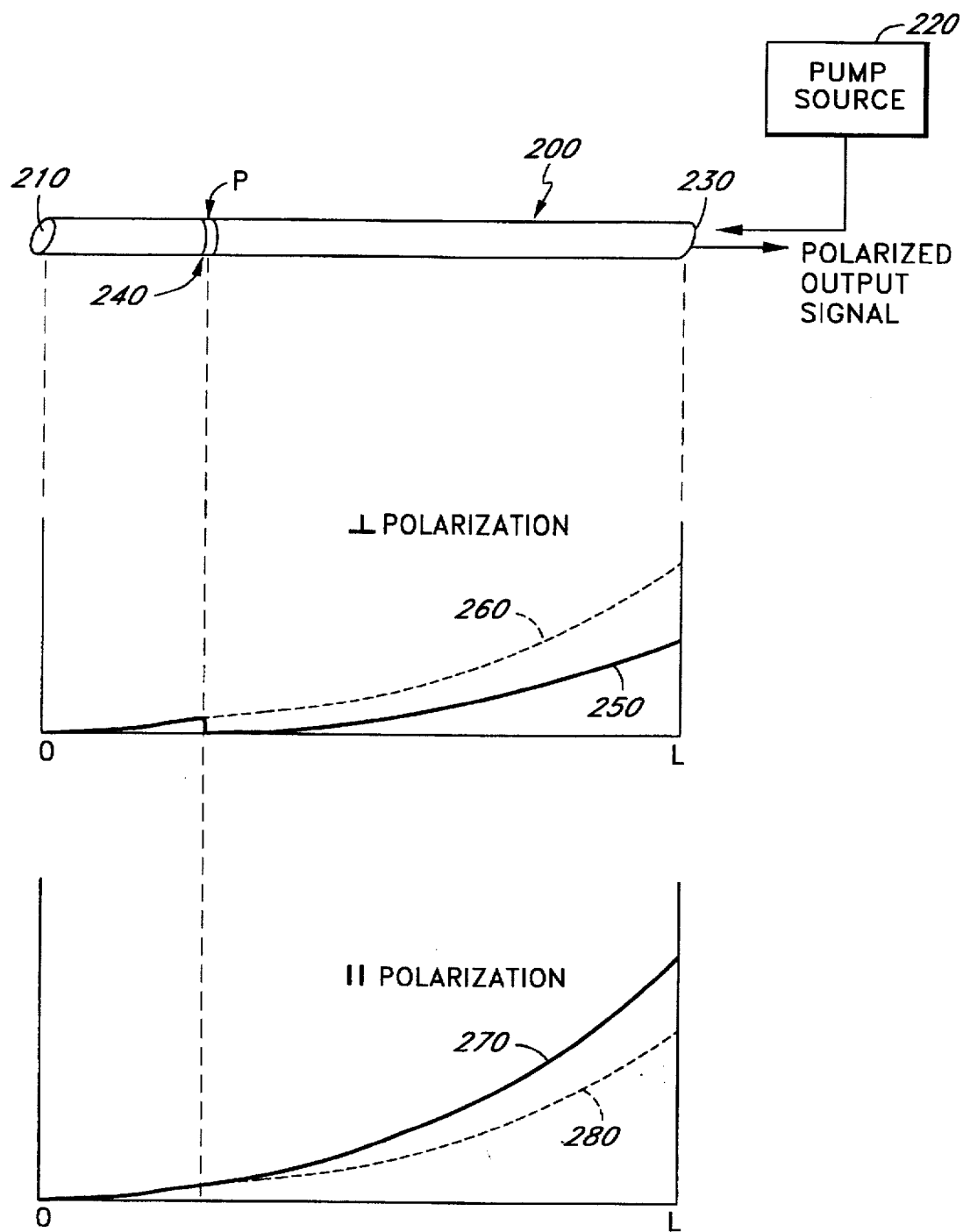
FIGS. 3A and 3B schematically illustrate one embodiment of the present invention wherein a polarizer is spliced along a portion of the superfluorescent fiber to provide a polarized output signal wherein one polarization mode power is substantially increased due to the decrease of the other polarization mode power.
Figure 3B:
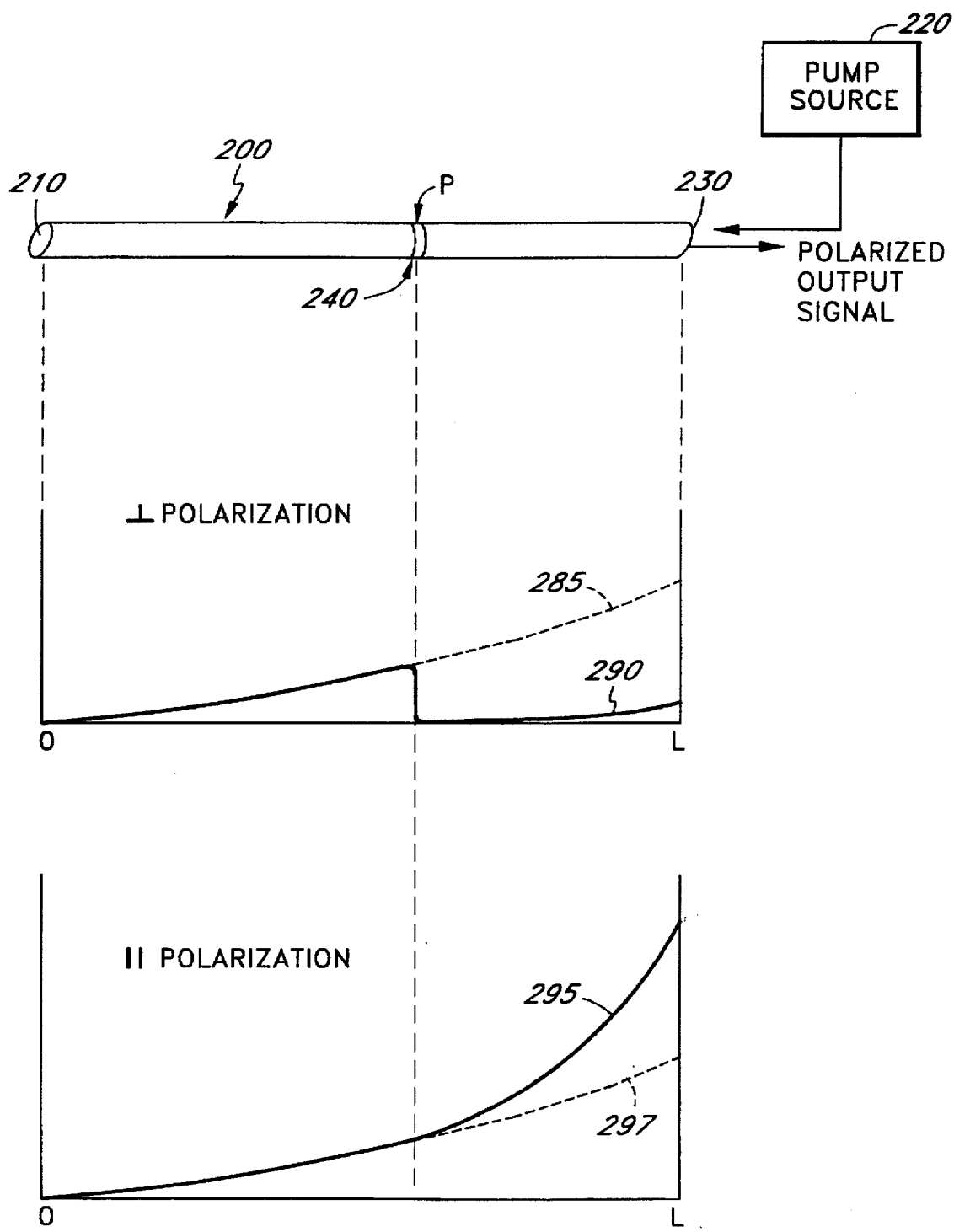

FIGS. 3A and 3B schematically illustrate an erbium-doped, superfluorescent fiber source 200 which is configured to act as a single-pass signal source which provides a polarized output signal. A pump source 220 inputs light at a pump wavelength $\lambda_p$ into an end 230 of the fiber 200 opposite from an end 210. In accordance with the present invention, the fiber 200 includes a polarizer 240 which may, for example, be spliced into the fiber 200 at a selected position along the length of the fiber 200.

As will be discussed in greater detail below, the fiber 200 is of a sufficient length to absorb substantially all of the pump signal. In the exemplary embodiment shown in FIGS. 3A and 3B, the length of the fiber 200, and the concentration of erbium dopant in the fiber, produce a fiber having a total attenuation of 300 dB for a small (i.e., low-power) input signal at a wavelength of 1.53 micrometers.

The polarizer 240 is preferably positioned so that the transmissive axis of the polarizer is lined up with the polarization of the pump signal. If the fiber 200 is a polarization maintaining fiber, then the polarizer 240 should be aligned with one of the axes of the fiber 200. However, if the fiber 200 is not polarization maintaining, then a polarization controller is used to align the polarization of the pump signal with the axis of the polarizer 240 so that the pump signal is not extinguished by the polarizer 240. In the embodiment described in FIGS. 3A and 3B, it is assured that the erbium-doped fiber is polarization maintaining.

In one advantageous embodiment, the polarizer 240 comprises a low-loss polarizer (e.g., about 1 decibel or less) having an extinction ratio of approximately 20 decibels or more. For example, one exemplary polarizer such as may be incorporated into the fiber 200 is available from THORLABS, Inc., and sold under the Model No. 3FS-PZ-7621. The methods for splicing the polarizer 240 into the fiber 200 are well known to those skilled in the art.

As depicted in FIG. 3A, the placement of the polarizer 240 at a place along the length of the fiber 200 serves to decrease the power of light in one polarization. As described herein, the parallel polarization of light is considered to be the preferred polarization (i.e., the polarization transmitted by the polarizer), while the perpendicular polarization is the polarization to be rejected. Of course, it should be understood that the perpendicular and parallel designations are arbitrary and what is simply signified here is that the polarizations are orthogonal and one polarization is extinguished while the other polarization is not extinguished.

In the example of FIG. 3A, a curve 260 (shown in dashed lines) represents the power which the perpendicular polarization of light would have if the polarizer 240 had not been placed within the fiber 200. A curve 250 illustrates the actual distribution of light in the perpendicular polarization throughout the fiber 200 with the polarizer 240 in place. As can be seen from the curve 250, the polarizer 240 serves to extinguish a portion of the light within the perpendicular polarization mode so that the light in this perpendicular polarization mode is repressed and does not begin to grow again until after the polarizer 240 (in the backward propagation direction). Thus, the final power of the output 230 of the light in the perpendicular polarization is less than it would have been had the polarizer 240 not been present.

The presence of the polarizer 240 not only serves to reduce the light in the perpendicular polarization, but also serves to increase the light in the parallel polarization. In particular, the curve 270 in FIG. 3A represents the power distribution of the parallel polarized light along the length of the fiber 200 with the polarizer in place, while the curve 280 (shown in dashed lines) represents the power distribution of the parallel polarized light in the absence of the polarizer 240. As can be seen from the graphs of FIG. 3A, the actual power of the light in the parallel polarization is increased over the power which light in the parallel polarization would have if the polarizer 240 were not present. The reason for this increase in the parallel polarized light is that light in the perpendicular polarization passes through a shorter gain region than the light within the parallel polarization. Thus, fewer of the photons which would normally be amplified into the perpendicular polarization are excited within the gain region, while the photons which would normally be stimulated by the perpendicular polarization throughout the length of the fiber 200, are instead stimulated by light in the parallel polarization so that an increased gain effect is observed by light in this parallel polarization. That is, the population inversion is not depleted as greatly by the perpendicular component as when the perpendicular component is present, so that more photons are generated in the parallel polarization component. Thus, in accordance with a preferred embodiment of the invention, the output signal provided at the end 230 of the fiber 200 is polarized (i.e., a substantially higher power of one polarization mode is output than another). A similar behavior applies to the forward propagation signal (not shown for simplicity in illustrating the preferred embodiment), with the same conclusion. This illustrates a key concept of the preferred embodiment. Namely, eliminating one of the polarization components with a polarizer reduces the power in that polarization, but also increases the gain (and thus the power) available for the other polarization component. FIG. 3B illustrates the effect of changing the position of the polarizer 240 along the length of the fiber 200. One advantageous aspect of the preferred embodiment of the invention involves optimally placing the polarizer 240 along the length of the fiber to obtain maximum power in a single polarization output from the end 230 of the fiber 200. It has been found that the point at which maximum power is obtained in the preferred polarization is a function of the length of the fiber, the concentration of erbium dopant in the fiber, and the power of the pump signal. The point at which maximum power is obtained in the preferred polarization can be expressed as an attenuation value of a given signal (i.e., having a given power and wavelength) along the length of the fiber. The characterization of the "optimum" position of the polarizer 240 in terms of an attenuation value will be discussed in greater detail with reference to the comparison between FIGS. 3A and 3B.

In the case shown in FIG. 3B (i.e., where the fiber has a length corresponding to 300 dB of small signal attenuation), the polarizer 240 is placed closer to the end 230 of the fiber 200 than in FIG. 3A. The effects of this placement of the polarizer 240 are depicted graphically by the curves 290, 295. In FIG. 3B, the curve 285 (shown as a dashed line) represents the power distribution of the perpendicular polarization of light without the polarizer 240 while the curve 290 represents the actual distribution of light in the perpendicular polarization given the position of the polarizer 240. Furthermore, the curve 297 represents the power distribution of parallel polarized light if the polarizer 240 were not present, while the curve 295 represents the actual power distribution of parallel polarized light with the polarizer 240.

It can be seen from FIGS. 3A and 3B that the position of the polarizer 240 along the length of the fiber 200 has a marked effect upon the degree to which the output signal from the fiber 200 is polarized. In particular, when the polarizer 240 is placed at the position of the fiber 200 depicted in FIG. 3A, then the output signal is not as highly polarized as when the polarizer 240 is placed at the position of the fiber 210 depicted in FIG. 3B. This is because when the polarizer 240 is placed in the position depicted in FIG. 3A, the light in the perpendicular polarization mode is extinguished early in the fiber 200 but is allowed to build up throughout the rest of the positive gain region of the fiber past the polarizer 240 (i.e., between the polarizer 240 and the output 230). Thus, a substantial portion of the light in the perpendicular polarization is still output by the fiber 200 as represented by the curve 250 of FIG. 3A. When the polarizer 240 is placed in the position depicted in FIG. 3B, however, light in the perpendicular polarization is extinguished far enough along the fiber to prevent a substantial build-up after the polarizer 240. At the same time, it will be recognized that the position of the polarizer 240 depicted in FIG. 3B is sufficiently spaced from the output end 230 of the fiber so that a substantial increase in the build-up in the preferred polarization can take place. Thus, when the polarizer 240 is appropriately positioned along the fiber 200, a balance is struck between the extinction of the perpendicular polarization and the amplification of the parallel polarization.

For example, if the polarizer 240 was placed at the end 230, then the output signal emanating from the end 230 of the fiber 200 would be substantially of one polarization. However, the placement of the polarizer 240 at this location along the fiber 200 would not result in an increase of the parallel polarization power over what it would be without a polarizer. Thus, no advantage would be gained by placing the polarizer at the end 230 of the fiber 200.

Again, if the polarizer 240 was placed at the end 210 of the fiber 200, then the two polarizations of light propagating in the backward direction would be substantially equal to begin with (where the polarizer meets the fiber) and would experience the same gain in passing through the fiber 200, so that both polarizations would have the same power at the output end 230 of the fiber 200.

However, by placing the polarizer 240 toward the middle of the fiber 200 as depicted in FIG. 3B, a substantial portion of the perpendicular polarization mode is extinguished and is not allowed to significantly build up before being output at the end 230. At the same time, the light which would have been output in the perpendicular polarization mode is added to the parallel polarization mode to nearly double the intensity of the light which is in the parallel polarization. This is represented by the curve 295 in FIG. 3B. From this it can be seen that placement of the polarizer 240 along the length of the fiber 200 has a significant effect upon the power of the light output in a particular polarization mode (i.e., the polarization which is not extinguished by the polarizer 240).

In certain measurements, when the polarizer 240 was placed approximately one-third of the distance between the end 210 and the end 230 of the fiber 200 (i.e., at about the small signal 100 dB attenuation point), the light in the non-extinguished polarization mode was found to be approximately 1.7 times the intensity of light in that polarization mode when the polarizer 240 is not present. This ratio diminishes significantly as the polarizer 240 is moved towards one end or the other of the fiber 200 from this optimum point.

Determining the Optimum Point in Relation to the Attenuation Along the Fiber

It should be noted here that the positioning of the polarizer 240 near the middle of the fiber 200 should not be considered with respect to the absolute, or actual length of the fiber 200 but rather with respect to that length of the fiber over which significant active signal generation occurs. That is, although the fiber 200 can be made to be any length, only a certain portion of the fiber 200 will absorb a significant amount of light at the pump wavelength to spur emission of light at the signal wavelength. Once the fiber 200 becomes so long that substantially no pump power is absorbed in the extended regions of the fiber 200, further increases in the length of the fiber 200 will have no appreciable effect on the intensity of the backward propagating output signal (i.e., the signal emitted from the end 230 in FIGS. 3A and 3B). Thus, in accordance with the preferred embodiment of the present invention, the polarizer 240 should not be placed near the 33% point of the actual fiber length for any fiber length, but rather at a selected point along the fiber 200 defined by the small-signal attenuation characteristics of the fiber 200.

In order to determine the so-called small signal attenuation characteristics of the fiber from which the fiber 200 is to be made, a number of techniques may be used. One technique is to transmit a low-power, optical signal into an end of the fiber. It is advantageous if the wavelength of this test signal is near the pump absorption or the signal absorption bands (the results discussed herein are based upon a test signal at the emission wavelength for erbium: 1.53 micrometers). During this test phase, the low-power test signal is the only signal propagating through the fiber (i.e., no pump signal is introduced into the fiber). Furthermore, the power of the signal should be low enough to ensure that the signal is non-saturating (i.e., so that there is virtually no population inversion).

It has been found that, for erbium-doped fibers, the attenuation for small signals is directly proportional to the length of the fiber so that one need only measure the attenuation after one meter. For example, if the attenuation at the test signal wavelength is 4 dB/meter, then 75 meters of fiber would define the 300 dB length of fiber.

It should be noted here that, although the test signal may be greatly attenuated along the selected length of fiber, in practice, the pump signal at normal operating power (around 30 mW) will not normally be attenuated to the same degree as the test signal along the same length of fiber. This is because the pump signal carries more power and will tend to saturate the fiber in the regions towards the pump input so that the actual attenuation of the pump signal at the end of the fiber may only be on the order of 30 or 40 dB. Pump signals at this attenuation are still significant as far as the emitted signal light at $\lambda_s$ is concerned since the fiber will typically exhibit 20 or 30 dB of gain for photons emitted at the far end of the fiber. Thus, even though a fiber is long enough to produce, for example, 300 dB of attenuation for the test signal, lengths significantly shorter than this length could affect the positioning of the polarizer 240 due to effects associated with pump powers much higher than the test signal power.

According to this method of locating the optimum position of the polarizer 240, a fixed, small-signal attenuation point (i.e., a point measured using the attenuation of a low-power test signal) is designated as the optimum point for all fibers beyond a sufficient length. As will be discussed in greater detail below, the optimum position for the polarizer 240 in fibers less than a specific length tends to approach 50% of the actual length of the fiber. The empirical and modeled results of testing on erbium fiber have identified the optimum position of the polarizer 240 to be at approximately the 70 dB small-signal attenuation point. This can be clearly illustrated from the curves plotted in FIG. 10.

Figure 10:
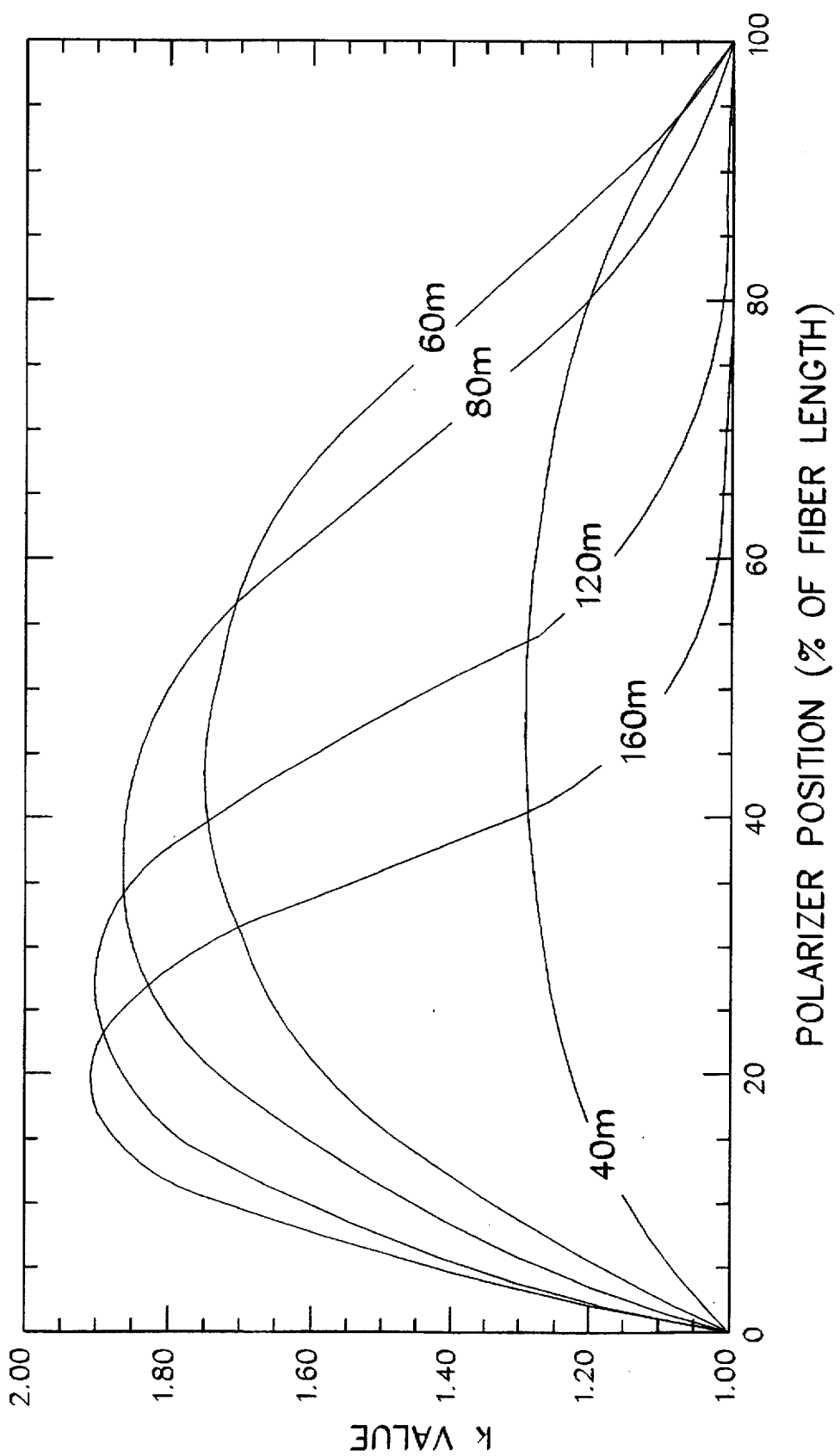
FIG. 10 graphically illustrates the relation between the position of a spliced polarizer along a superfluorescent fiber and the ratio by which the power of the preferred polarization exceeds the power of that same polarization if the polarizer were not present.

FIG. 10 plots a ratio, k, versus position of the polarizer along the length of the fiber. The ratio k is defined as the ratio of the output power in the preferred polarization in the backward direction with the polarizer to the output power in the preferred polarization in the backward direction without the polarizer. Several curves are plotted in FIG. 10, wherein each curve represents a different length fiber. As can be seen from the curves of FIG. 10, longer fibers have an optimum ratio value (i.e., present a maximum) at a lower percentage of the total fiber length. However, for those curves having a maximum ratio value near 1.9 (i.e, very long fibers), it can be seen that the polarizer 240 has an optimum position at approximately the same length from the pump input end. For example, for the 160 meter fiber, the optimum position of the polarizer is at about 19% of the total length of the fiber (i.e., 30.4 meters). Similarly, for the 120 meter fiber, the optimum position of the polarizer is at about 26% of the total length of the fiber (i.e., 31.2 meters). Likewise, for the 80 meter fiber, the optimum position of the polarizer is at about 38% of the total length of the fiber (i.e., 30.4 meters). Thus, it can be seen that the optimum position for the polarizer 240 is at about 30–31 meters along the length of the fiber 200.

Although placing the polarizer 240 at the 30–31 meter point is optimum for a fiber having a specified concentration of erbium dopant (i.e., 2.2 dB per meter small-signal absorption in this example), it will be understood that the essential parameter to be determined is the small-signal attenuation along the fiber rather than the actual length. This is because the measured small-signal attenuation takes dopant concentration into consideration so that the optimum position for the polarizer 240 expressed in units of small-signal attenuation remains substantially constant. This fixed attenuation point has been empirically (and theoretically) determined to be at about 66–68 dB (i.e., 30–31 meters times 2.2 dB/meter) for fibers over a sufficient length.

At this point it must be noted that as the fiber 200 becomes shorter, the optimum polarizer position approaches the midpoint of the fiber. This effect is also shown in FIG. 10. For example, the optimum position for the polarizer in the 60 meter fiber is at about 44% of the total length of the fiber (i.e., 26.4 meters corresponding to 58.1 dB attenuation), while the optimum position for the polarizer 240 in the 40 meter fiber is about 50% of the total length of the fiber (i.e., 20 meters corresponding to 44 dB attenuation. Thus, as a fiber becomes so short that the optimum attenuation point (e.g., 67 dB) is nearly half of the total attenuation throughout the entire length of the fiber, the optimum position of the polarizer moves towards the center of the fiber 200.

As a practical consideration, for fibers having a small-signal attenuation (i.e., along their entire length) substantially more than twice the optimum attenuation point (e.g., 67 dB), the polarizer 240 should be positioned at the 67 dB point (although positioning the polarizer 240 in the range of 40 dB to 100 dB may still prove advantageous). However, for shorter fibers, the polarizer should be placed close to 50% of the entire fiber length as determined empirically.

Alternate Method of Determining the Optimum Polarizer Position

According to an alternative method of positioning the polarizer 240, a substantially complete attenuation length (i.e., the length of fiber past which no significant emission of signal light at $\lambda_s$ is contributed) could be defined to be the length for which the small-signal attenuation of the fiber is approximately 300 dB. Of course, it will be understood that, in theory, the longer a fiber is, the better the output power in the backward direction. However, as discussed herein, the optimum fiber length refers to the shortest fiber length which gives nominally the same output power characteristics. For applications where extracting the highest possible power from the source is important, the substantially complete attenuation length could be defined to have a length corresponding to 600 dB. Conversely, for applications where maximizing the output power is not as important the substantially complete attenuation length could be defined to have a length corresponding to as little as 170 dB. Given the substantially complete attenuation length of the fiber 200, the position of the polarizer 240 advantageously falls within the range of 20% to 50% of the substantially complete attenuation length.

It has been found that by placing the polarizer 240 along the length of the fiber 200 according to the above formulations, the output intensity of light and the non-extinguished polarization mode is substantially doubled so that a highly polarized output signal is provided to the end 230 of the fiber 200 which is double the original power (i.e., intensity) in that polarization.

It will be appreciated by those of skill in the art, that it is important that the polarizer 240 be a low-loss polarizer. In practice, it is highly advantageous if the polarizer 240 has less than one or one-half decibel loss for the non-extinguished (i.e., preferred) polarization mode. That is, if the perpendicular polarization mode is to be extinguished by the polarizer 240, the parallel polarization should not experience a loss of more than one or one-half decibel when propagated through the polarizer 240. The first reason for this is that any pump light lost at the polarizer will result in a lower gain downstream from the polarizer, and thus will result in a lower signal power. The second reason is that any signal light in the desired polarization which is lost due to the loss effects of the polarizer 240 will not contribute to the amplified light generated within the gain region of the fiber 200. Thus, if the polarizer 240 contributes to too high of a loss of a preferred polarization, the net output signal will not be significantly higher than the power of the preferred polarization without the polarizer 240. In fact, if the polarizer insertion loss is sufficiently great, the power of the preferred polarization can even be lower than the power in the preferred polarization without the polarizer 240. Consequently, the polarizer 240 must have a loss that does not exceed a certain level (e.g., 3 dB for backward propagating light) to obtain the benefits of the preferred embodiment.

Erbium-Doped Fiber Source Made From Polarizing Fiber

FIG. 4 schematically illustrates another preferred embodiment of the invention wherein the entire superfluorescent fiber comprises a rare-earth-doped polarizing fiber so that one polarization mode is substantially extinguished over the entire length of the fiber while the output signal in the other polarization mode is guided as in a normal fiber. As shown in FIG. 4, a superfluorescent fiber 300 comprises polarizing fiber from an input end 330 of the fiber 300 to an end 310 of the fiber 300. A pump source 320 inputs light to the end 330 of the fiber 300. The superfluorescent source configuration depicted in FIG. 4 is a single-pass configuration wherein light propagates along the fiber 300 to the end 310 in a forward propagation direction and is absorbed and re-emitted in the backward direction so that light is mostly amplified in the backward propagating direction to produce a polarized output signal at the end 330. As with the fibers 100 (FIG. 2) and 200 (FIGS. 3A and 3B), the fiber 300 advantageously comprises a long, erbium-doped fiber, which implies high-efficiency backward propagation characteristics.

In accordance with a preferred embodiment of the invention, the fiber 300 is polarizing along its entire length and doped with an appropriate concentration of rare earth ion. In the graphs of FIG. 4, the curve 340 represents the power distribution of perpendicularly polarized light throughout the fiber 300 while the curve 350 represents the power distribution of parallel polarized light along the length of the fiber 300. The curves 360, 370 (shown in dashed lines in FIG. 4) represent the power distribution which the parallel and perpendicular polarizations of light, respectively, would have if the fiber 300 was not polarized. As can be seen from the graphs in FIG. 4, when the fiber 300 is polarizing, light in the polarization to be extinguished (i.e., the perpendicular polarization as shown in the example of FIG. 4) remains substantially zero throughout the entire length of the fiber 300. In contrast, the light in the desired polarization (i.e., the parallel polarization in the example of FIG. 4) increases more rapidly, and has an output power which is approximately double what it would be if the fiber 300 was not polarizing.

By polarizing the fiber 300 along its entire length, it can be seen that the output intensity of light and the preferred polarization (represented by a power $A_2$ in FIG. 4) is substantially higher than the power which this polarization would have were the fiber 300 not polarized (represented by a power $A_1$ in FIG. 4). In one actual simulation, it was determined that the power $A_2$ is approximately 1.95 $A_1$ so that substantially all of the light which would have propagated through the fiber 300 in the perpendicular polarization is converted to the parallel polarization, and the output signal in the parallel polarization is thereby nearly doubled. It should be appreciated that the polarizing fiber 300 gives a slightly better output power in the preferred polarization than the best results predicted by modeling when employing the spliced polarizer embodiment of FIGS. 3A and 3B. Thus, the embodiment of the invention depicted in FIG. 4 provides for a highly efficient, highly polarized output signal for use, for example, as a light source for applications which require highly polarized light such as a fiber optic gyroscope.

Figure 5:
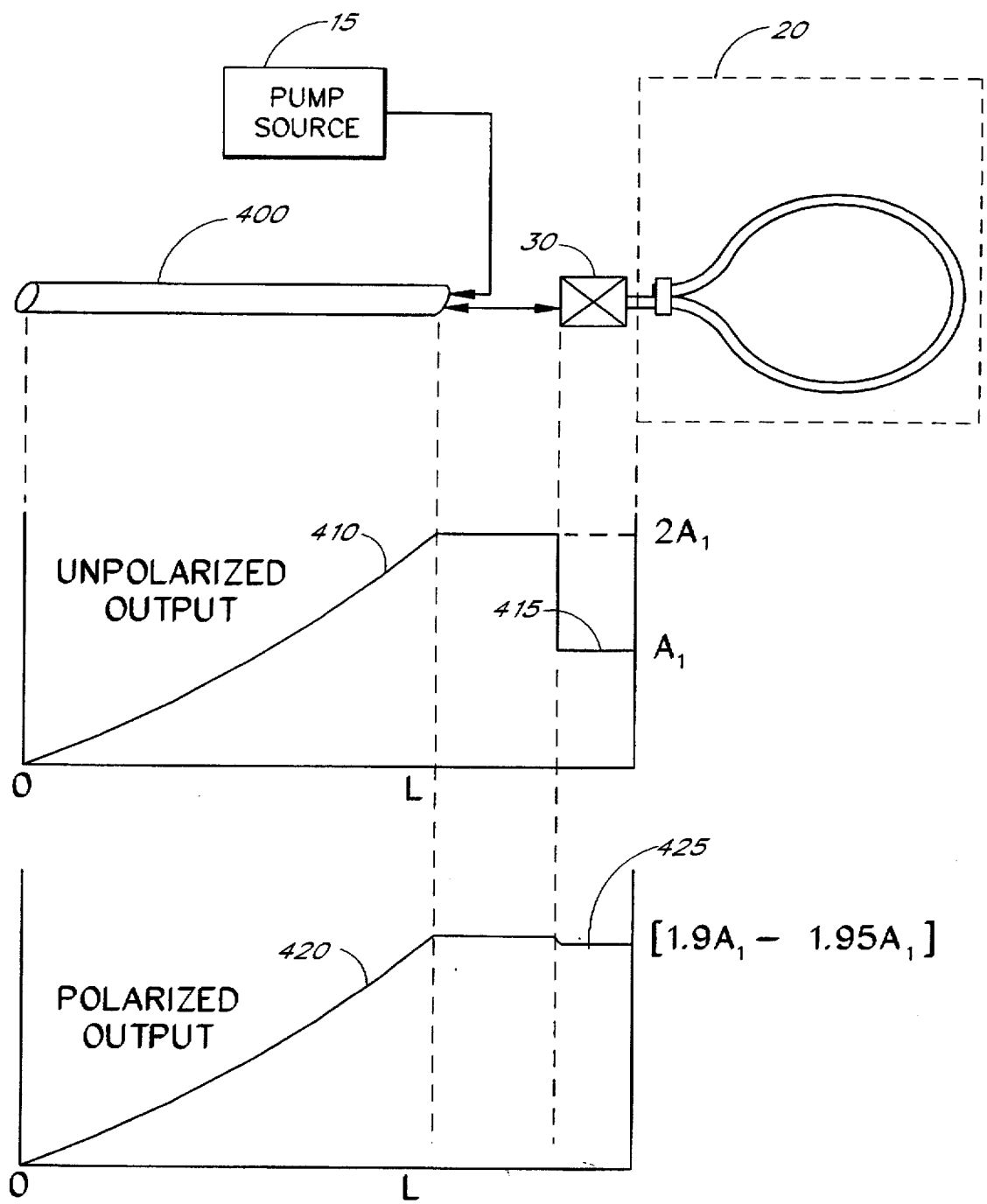
FIG. 5 schematically illustrates the significant advantages obtained by use of the polarizing unidirectional fiber source of the present invention when implemented to operate in conjunction with a fiber optic gyroscope having a polarizing input.

FIG. 5 schematically illustrates the significant advantages obtained by the use of the polarizing, fiber source of the preferred embodiment of the present invention when implemented to operate in conjunction with a fiber optic gyroscope having a polarizing input. In particular, the fiber optic gyroscope 20 having an input polarizer 30 receives light from a superfluorescent fiber source 400 pumped by the input pump source 15. The fiber 400 as depicted in FIG. 5, may advantageously comprise an erbium-doped fiber, or the like, having a polarizer spliced in the appropriate location (as in the embodiment of FIG. 3B) or may be polarizing along its entire length (as illustrated in the embodiment of FIG. 4).

Two graphs are depicted in FIG. 5 to illustrate the advantages of the preferred embodiment of the present invention over conventional superfluorescent fiber sources such as that depicted in FIG. 2. A first curve 410 represents the power distribution of the signal light in the backward direction within the fiber 400 over the length of the fiber 400. The light represented by the curve 410 is unpolarized light, such as may be found in a conventional erbium-doped fiber not incorporating the polarizing aspect of the preferred embodiments of the invention. As can be seen from the curve 410, the signal power within the fiber 400 builds up to a maximum value (shown as $2A_1$ in FIG. 5) at the output of the fiber 400. This power is constant until the signal light enters the polarizer 30, at which point substantially half of the light from the source 400 is extinguished within the polarizer 30, due to the fact that the light is highly unpolarized. This is represented by a curve 415 at a power $A_1$.

As can be seen from the second graph in FIG. 5, a curve 420 represents the power distribution of the signal light which propagates through the fiber 400 in the backward direction when the fiber 400 is polarizing according to the preferred embodiments of the invention. As represented by the curve 420, the power of the signal output is maximum at the output end of the fiber 400 and remains substantially constant until entering the polarizer 30. Due to the high degree of linear polarization of the output signal, only a slight decrease is observed in the power of the light after passing through the polarizer 30, as represented by a portion 425 of the curve 420. This is due, in part, to the extinction of the light which remains in the undesirable polarization, and also to the inherent loss in the preferred polarization due to the polarizer 30. As can be seen from the second graph in FIG. 5, the final light power provided as an input to the fiber gyroscope 20 is approximately 1.9 to 1.95×$A_1$ which is nearly double the light power which would be input to the fiber optic gyroscope 20 if the present invention was not implemented within the fiber source 400.

A further advantage of the preferred embodiment of the invention depicted in FIG. 5 is provided because the light emitted from the fiber 400 is already highly polarized. Therefore, a less expensive polarizer having less stringent extinction ratio characteristics can be used in place of the polarizer 30.

Figure 6A:
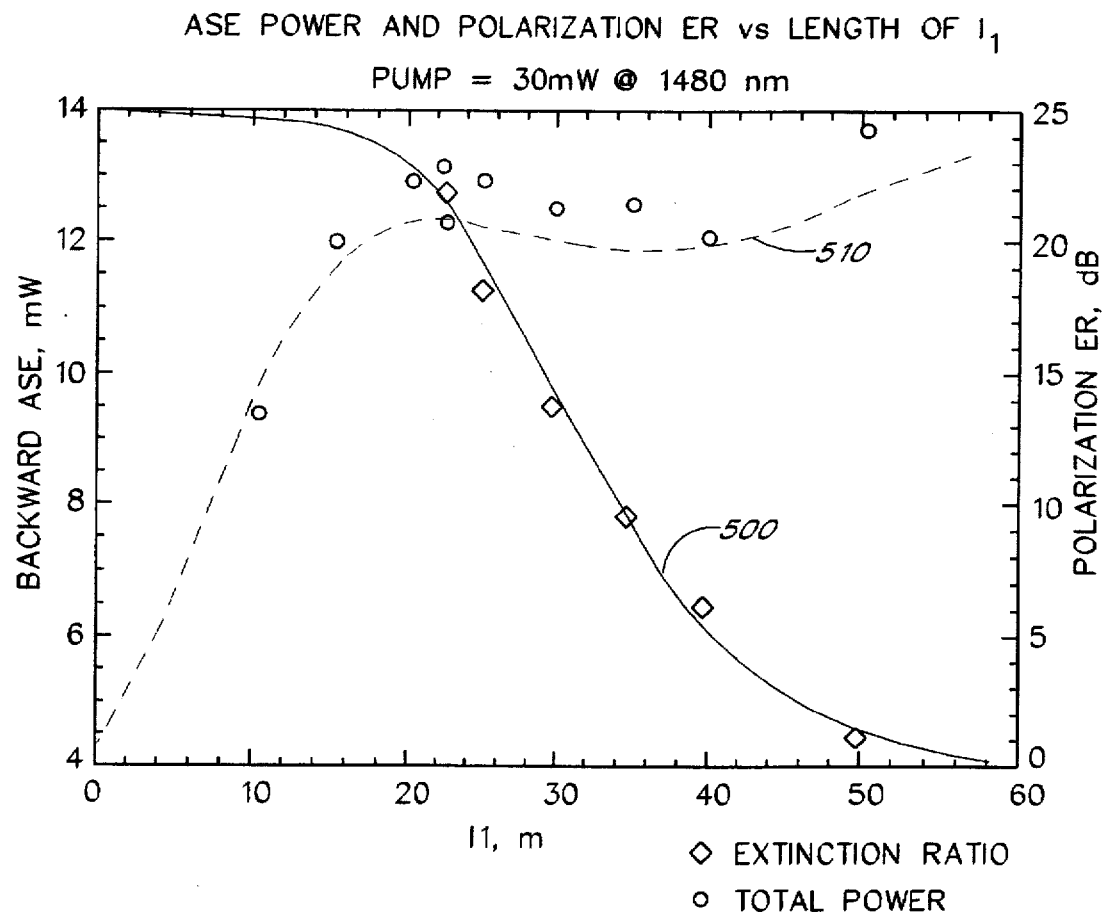
FIG. 6A graphically illustrates the experimental results as a plot of signal output power and polarization extinction ratio versus the length of fiber in a spliced polarizer embodiment.
Figure 6B:
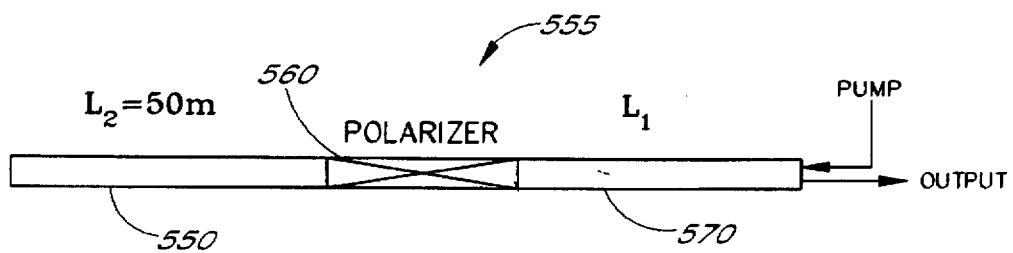
FIG. 6B is a schematic diagram of a superfluorescent fiber source configuration used to obtain the experimental results of FIGS. 6A –8.

FIG. 6A graphically illustrates experimental results as a plot of signal output power and polarization extinction ratio in the backward direction versus the length of fiber in the spliced polarizer embodiment of FIGS. 3A and 3B. The results graphically depicted in FIG. 6A are for a pump power of about 31 milliwatts at 1470 nanometers, where the superfluorescent fiber constitutes an erbium-doped fiber in the configuration depicted in FIG. 6B. As shown in FIG. 6B, a superfluorescent fiber 555 includes a first length of erbium-doped fiber 550 and a second length of erbium-doped fiber 570 having a polarizer 560 spliced therebetween. One actual embodiment of the fiber 555 used to obtain the results of FIG. 6A has attenuation characteristics of 4 dB/meter at the pump wavelength. The length, $L_2$, of the fiber portion 550 is equal to 50 meters in the particular example depicted in FIGS. 6A and 6B. The length, $L_1$, of the portion 570 was varied to obtain the experimental results of FIG. 6A.

A curve 500 in FIG. 6A represents a measure of the polarization of the output light signal emitted from the superfluorescent fiber 555 of FIG. 6B. A curve 510 (shown in dashed lines) represents the power, in milliwatts, of the backward emitted light (i.e., the output signal) emitted from the fiber 555 of FIG. 6B. As can be observed from the curve 500, the output light signal starts at a very low degree of polarization (i.e., is nearly unpolarized) for a length of $L_1$ equal to 50 meters. As the length of $L_1$ is gradually shortened, the output signal becomes more and more highly polarized to an extinction ratio of approximately 26 decibels (due to the characteristics of the polarizer 560). Conversely, the curve 510 shows that the power provided by the output light signal decreases, but only slightly, as the length from the fiber portion 570 is decreased, down to about 20 meters, and thereafter drops off.

In order to arrive at the optimum length of the fiber portion 570, the product between the output power and the polarization extinction ratio is taken to determine where the maximum power output of highly polarized light is provided. From the graph depicted in FIG. 6A, it can be seen that this point occurs when the length $L_1$ of the fiber portion 570 is approximately 20–25 meters when $L_2$ is equal to 50 meters.

Figure 7:
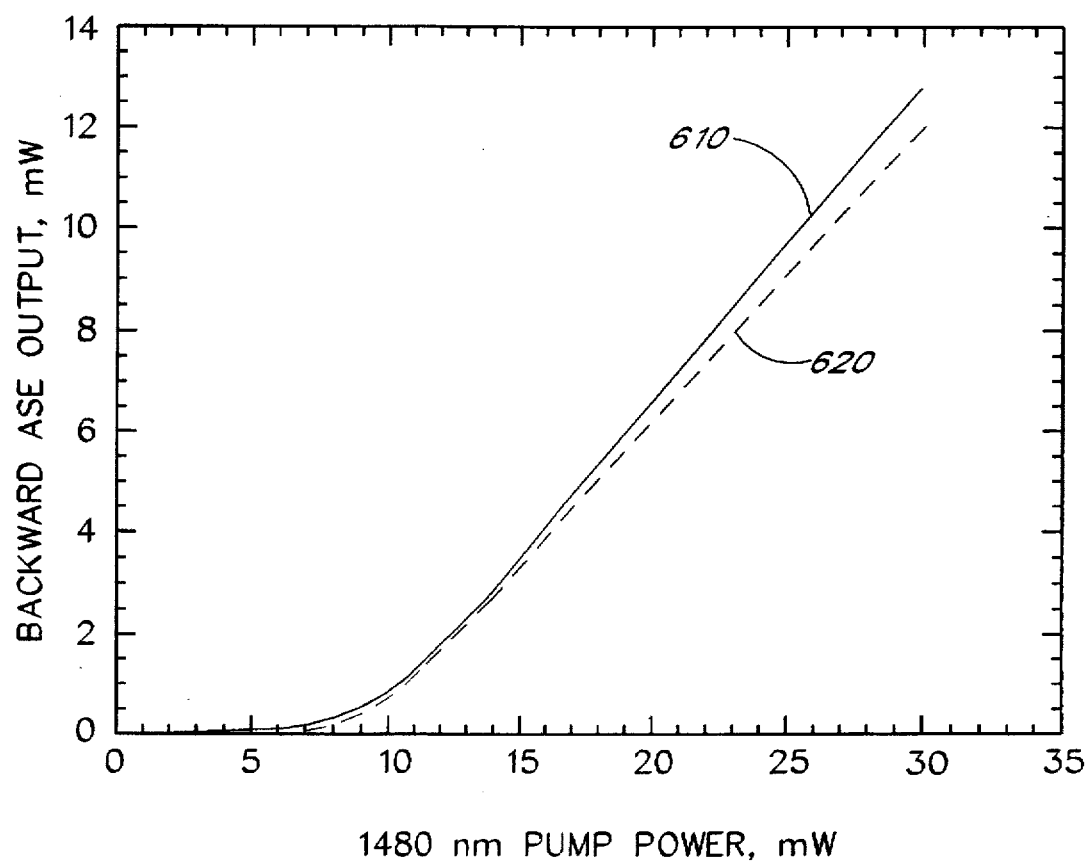
FIG. 7 graphically illustrates experimental and modeled signal output powers versus the input pump power.

FIG. 7 graphically illustrates experimental and model signal output powers versus the input pump power for the source of FIG. 6B. In the graph depicted in FIG. 7, the input pump signal has a wavelength of $\lambda_p$=1470 nanometers. As shown from both the modeled and experimental results (depicted respectively by curves 610, 620 in FIG. 7), the backward output power (i.e., the output signal of the superfluorescent fiber) bears a substantially linear relationship to the input pump power for input pump powers above 10 milliwatts. It can be seen from FIG. 7 that there is a close agreement between the modeled and the experimental points. This supports the accuracy of the model used to simulate the fiber in other circumstances.

Figure 8:
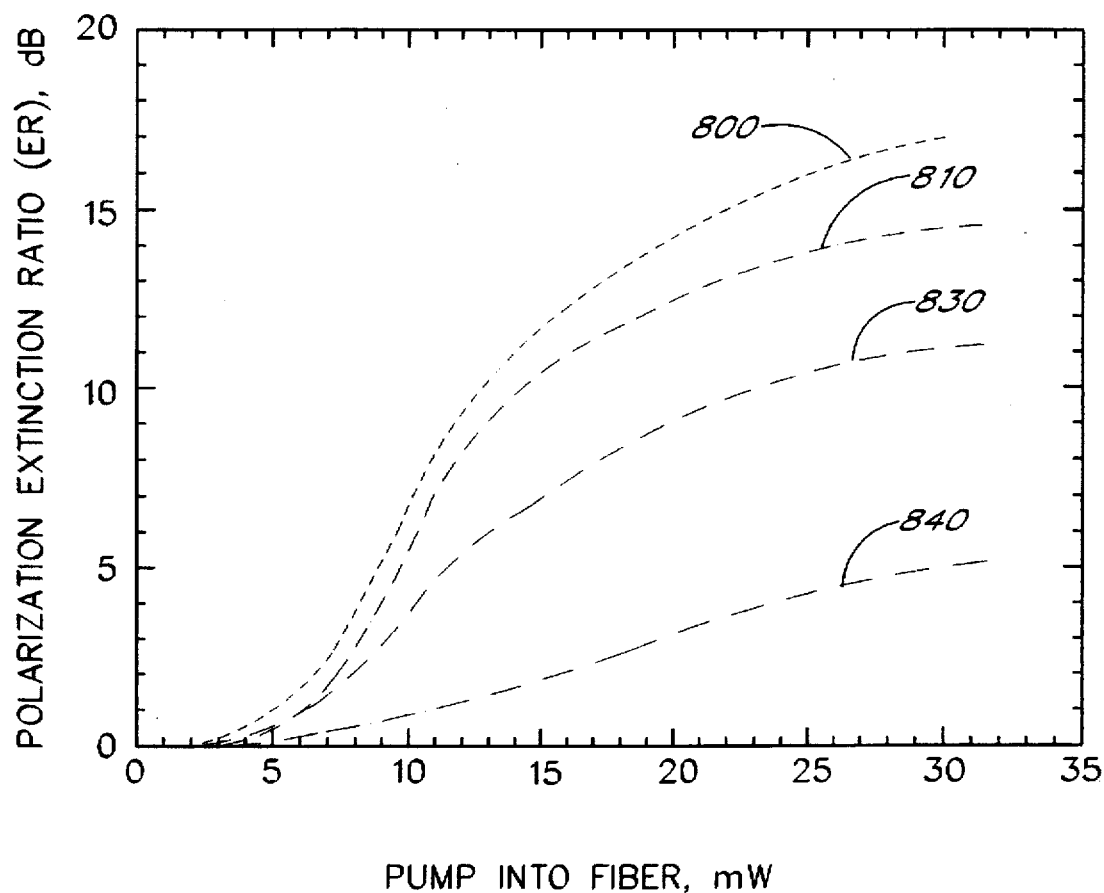
FIG. 8 graphically illustrates experimental and modeled output polarization extinction ratios plotted versus input pump power.

FIG. 8 graphically depicts experimental and modeled output polarization extinction ratios versus pump power. A series of curves 800–840 represent the polarization extinction ratio as a function of input pump power for a modeled length $L_1$ (see FIG. 6B) of 20 meters (curve 800); an experimentally plotted curve of $L_1$=25 meters (curve 810); an experimentally determined curve for a length $L_1$ =30 meters (curve 830); and an experimentally plotted curve for a length $L_1$=40 meters (curve 840). As can be seen from the curves 800, 810 (which are near the optimum length determined from the graph of FIG. 6A), the output signal is highly polarized for input pump powers over 10 mW. Thus, it will be appreciated here that the experimental results obtained during testing of the preferred embodiments indicated a number of advantages associated with the present invention. For example, the increase in power observed for the preferred polarization of the output signal is nearly maximum (about 1.9) and remains substantially constant down to low pump powers (e.g., on the order of ten milliwatts).

Furthermore, the ratio by which the preferred polarization is increased is substantially independent of the total fiber length ($L_1$ together with $L_2$) so long as the superfluorescent fiber is long enough. This latter effect is depicted in FIG. 10. As can be seen from the graph of FIG. 10, the maximum ratio value (about 1.9) is substantially the same for the longer fibers (80 meters and longer in the example of FIG. 10). However, once the fibers are shortened so that a significant amount of pump power is not absorbed, the maximum ratio value begins to decrease. In addition, FIG. 10 also illustrates how the maximum ratio position for the shorter fibers moves towards the middle of the fiber, while longer fibers have a maximum ratio position closer to the pump input end of the fiber.

Figure 9:
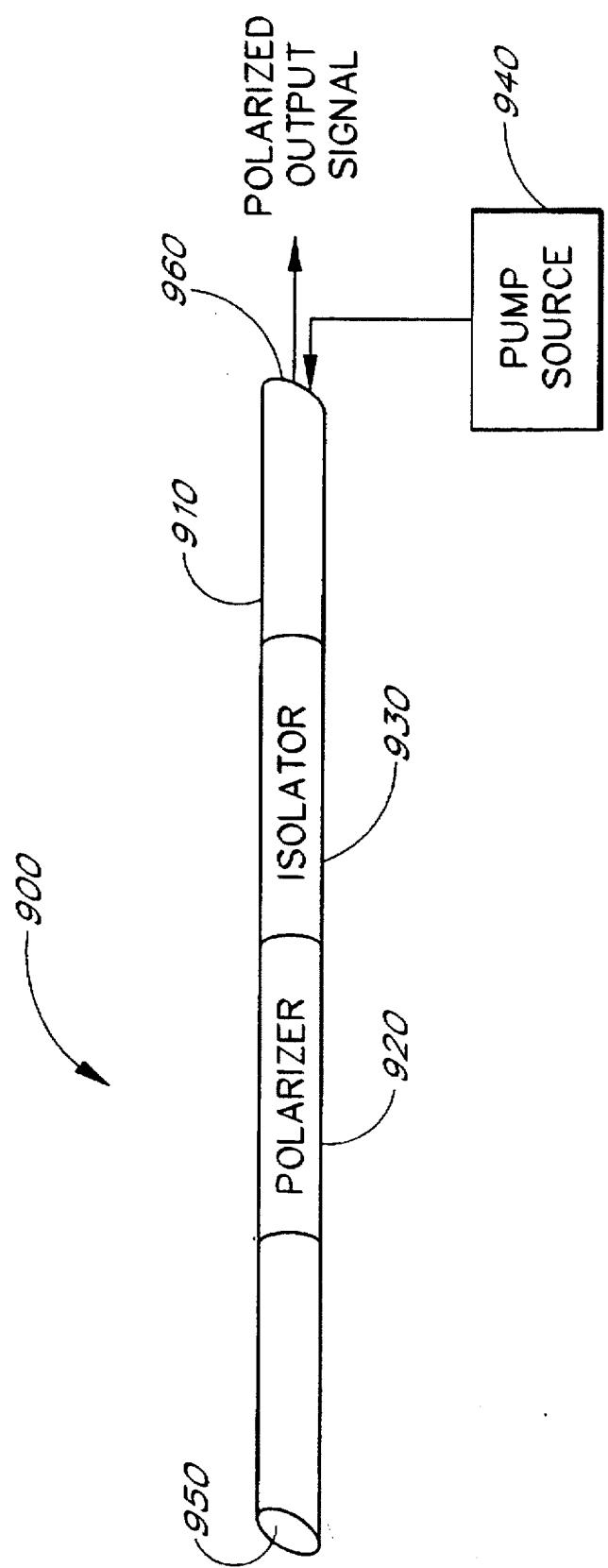
FIG. 9 depicts a further embodiment of the invention wherein a unidirectional fiber source is constructed using an isolator placed at the appropriate location along the length of the fiber.

FIG. 9 depicts a further embodiment of the invention wherein a unidirectional fiber source 900, having first and second ends 950, 960, respectively, is constructed using an isolator 930 placed at the appropriate location along the length of a superfluorescent fiber 910. In the configuration of FIG. 9, a polarizer 920 is also included within the source 900, although it should be appreciated that the advantages associated with placing the isolator 930 at the appropriate location along the fiber 910 are independent of the advantages associated with the placement of the polarizer 920.

Briefly, it has been found that the placement of the isolator 930 at an appropriate location along the length of the fiber 910 results in a unidirectional light source (similar to that provided by a double-pass configuration), but which has a higher wavelength stability than the double-pass configuration. Thus, such a unidirectional source is less sensitive to feedback from a fiber optic gyroscope, for example. Moreover, the placement of the isolator 930 at the appropriate location can result in a net increase of power in the preferred propagation direction than would be observed if the isolator 930 were not present.

In operation, a pump source 940 generates pump light at a wavelength $\lambda_p$, which is input to the second end 960 of the fiber 910. The pump light stimulates emission of light at a signal wavelength $\lambda_s$, in both the forward and backward propagation directions. However, due to the presence of the isolator 930, the backward propagating light is suppressed while the forward propagating light is allowed to propagate freely. Because the population inversion is not as strongly depleted by the backward propagating light, more gain is available to the forward propagating light so that the forward propagating light extracts a higher power from the fiber laser medium. Thus, the power of the forward propagating light is increased above and beyond the power which the forward propagating light would have if the isolator 930 was not present. In practice, substantially the same intensity of output light can be generated from an output end 960 of the source 900 as is generated in the double-pass configuration. However, light emitted from the unidirectional source 900 has the advantage of having increased stability (i.e. a reduced sensitivity of power to feedback from the end 960).

Thus, the behavior of the forward and backward propagating light in the presence of an isolator is analogous to the behavior of polarized light in the presence of a polarizer where the counter-propagating waves are equivalent to the orthogonal polarization modes. As with the polarizer 240, the placement of the isolator 930 should be at a position in the range of one third to one-half of the length of the absorptive region of the fiber 910. This principle could apply to any one of a number of optical discriminators which discriminate between two modes of optical radiation, each of which carries a significant portion of the optical power.

It should be noted here that, if the backward propagating light is the preferred propagation direction, then the isolator 930 can be configured as a dichroic isolator which allows the propagation of the pump signal in the forward direction, but suppresses the output signal in the forward direction.

Finally, as depicted in FIG. 9, the polarizer 920 can be incorporated into the source 900 as discussed above in order to provide a unidirectional, polarizing fiber light source which outputs unidirectional, highly-stable, highly-polarized light without a significant loss of power efficiency. It should be observed in such a configuration, however, that the splicing of the polarizer 920 and the isolator 930 be carefully performed so that less than about 1 dB of loss is experienced due to the incorporation of the polarizer 920 and the isolator 930.

Although the preferred embodiments of the present invention have been described in detail herein, it will be appreciated by those of ordinary skill in the art that certain alterations and modifications could be made to the embodiments of the invention described herein without departing from the spirit or essential characteristics of the invention. For example, different types of dopants and doping concentrations may be used within the superfluorescent fiber as called for by the particular application. Similarly, the polarizer or polarizing method selected for implementation of the invention may be determined by the particular circumstances in which the invention is to be embodied. In addition, the invention may be embodied in an integrated optics or other non-fiber, optically propagating medium. Also, the invention could be implemented in a double-pass fiber source with much the same merits, provided the polarizer (and/or isolator) is inserted at a new optimum position along a fiber having a new optimum length. Therefore, the scope of the invention should be interpreted in light of the following appended claims.

What is claimed is:

1. A superfluorescent light source comprising:
   an optically propagating waveguide having a first end and a second end;
   a pump source which provides a pump signal having a first wavelength at said first end of said waveguide to stimulate emission of light within said waveguide at a second wavelength different than said first wavelength; and
   a polarizer placed at a position along said waveguide so as to substantially increase the emission of light in a preferred polarization from one of said first and second ends of said waveguide.

2. A superfluorescent light source as defined in claim 1, wherein said optically propagating waveguide comprises an optical fiber.

3. A superfluorescent light source as defined in claim 2, wherein said polarizer is spliced into said fiber.

4. A superfluorescent light source as defined in claim 2, wherein said optical fiber is doped with erbium.

5. A superfluorescent light source as defined in claim 1, wherein said polarizer has an extinction ratio of greater than 15 dB and a loss in the preferred polarization of less than 1 dB.

6. A superfluorescent light source as defined in claim 1, wherein said polarizer is placed between the 40 dB and 100 dB small-signal attenuation points, measured at said second wavelength along the length of the waveguide measured from said first end of said waveguide.

7. A superfluorescent light source as defined in claim 6, wherein said polarizer is placed between the 66 dB and 68 dB small-signal attenuation points, measured at said second wavelength along the length of the waveguide measured from said first end of said waveguide.

8. A superfluorescent light source as defined in claim 1, wherein said polarizer is placed between 20% and 50% of the substantially complete attenuation length of the waveguide measured from the first end of said waveguide.

9. A superfluorescent light source as defined in claim 1, wherein said pump source emits light at a wavelength of about 1.48 micrometers and said light emitted from said waveguide has a wavelength of about 1.53 micrometers.

10. An optical waveguide for use as a superfluorescent light source, said waveguide comprising an optically propagating substrate, wherein at least a portion of said substrate propagates light in one polarization and extinguishes light in an orthogonal polarization, said optical waveguide further being altered so that pump light input into said waveguide at a first wavelength stimulates emission of light within said waveguide at a second wavelength.

11. An optical waveguide as defined in claim 10, wherein said optically propagating substrate comprises an optical fiber and said optical fiber is polarizing along the entire length of said optical fiber.

12. A superfluorescent light source comprising:
    a pump light source which emits pump light at a first wavelength; and
    an optically propagating waveguide, wherein at least a portion of said waveguide propagates light in one polarization and extinguishes light in an orthogonal polarization, said optical waveguide further being altered so that said pump light input into said waveguide at said first wavelength stimulates emission of light within said waveguide at a second wavelength.

13. A superfluorescent light source as defined in claim 12, wherein said waveguide comprises an optical fiber.

14. An optical instrument comprising:

a pump light source which emits pump light at a first wavelength;

an optically propagating waveguide having a first end and a second end, wherein at least a portion of said waveguide propagates light in one polarization and extinguishes light in an orthogonal polarization, said optical waveguide further being altered so that said pump light input into said waveguide at said first wavelength stimulates emission of light within said waveguide at a second wavelength; and a fiber optic gyroscope including a fiber loop which receives light at said second wavelength from said waveguide as an input to said fiber loop.

15. An optical instrument as defined in claim 14, wherein said waveguide comprises an optical fiber.

16. A unidirectional, superfluorescent light source comprising:

an optically propagating waveguide having a first end and a second end;

a pump source which provides a pump signal at said first end of said waveguide to stimulate emission of light within said waveguide; and an isolator placed at a position along said waveguide so as to substantially increase the emission of light in a preferred propagation direction from said first end of said waveguide when said preferred propagation direction is a backward propagation direction and from said second end of said waveguide when said preferred propagation direction is a forward propagation direction.

17. A unidirectional, superfluorescent light source as defined in claim 16, wherein said optically propagating waveguide comprises an optical fiber.

18. A unidirectional, superfluorescent light source as defined in claim 17, wherein said optical fiber is doped with erbium.

19. A unidirectional, superfluorescent light source as defined in claim 17, wherein said isolator is spliced into said fiber.

20. A unidirectional, superfluorescent light source as defined in claim 16, wherein said isolator has an extinction ratio of greater than 15 dB and a loss in the preferred propagation direction of less than 1 dB.

21. A unidirectional, superfluorescent light source as defined in claim 16, wherein said isolator is placed between the 66 dB and 68 dB small-signal attenuation points, measured at said second wavelength along the length of the waveguide measured from the first end of said waveguide.

22. A unidirectional, superfluorescent light source as defined in claim 16, wherein said isolator is placed between 20% and 50% of the substantially complete attenuation length of the waveguide measured from the first end of said waveguide.

23. A unidirectional, superfluorescent light source as defined in claim 16, wherein said light source further comprises a polarizer positioned within said waveguide at or near the position of said isolator.

24. A superfluorescent light source comprising:

an optically propagating waveguide having a first end and a second end;

a pump source which provides a pump signal at said first end of said waveguide to stimulate emission of light within said waveguide; and an optical discrimination apparatus which is placed at a selected position along said waveguide so as to substantially increase the emission of light in a preferred optical mode, so that said light in said preferred optical mode is increased while light in a non-preferred optical mode is decreased by the action of said optical discrimination apparatus.

25. A superfluorescent fiber source as defined in claim 24, wherein said optical discrimination apparatus comprises a polarizer.

26. A superfluorescent fiber source as defined in claim 24, wherein said optical discrimination apparatus comprises an isolator.

27. A superfluorescent light source comprising:

an optically propagating waveguide having a first end and a second end;

a pump source which provides a pump signal having a first wavelength at said first end of said waveguide to stimulate emission of light within said waveguide at a second wavelength different than said first wavelength; and a polarizer placed at a position along said waveguide so as to maximize the emission of light in a preferred polarization from one of said first and second ends of said waveguide.

* * * * *